E. L. RATHBURN.
FLUID PRESSURE CONTROL SYSTEM.
APPLICATION FILED MAR. 18, 1920.

1,374,323.

Patented Apr. 12, 1921.
2 SHEETS—SHEET 1.

INVENTOR
Emory L. Rathburn

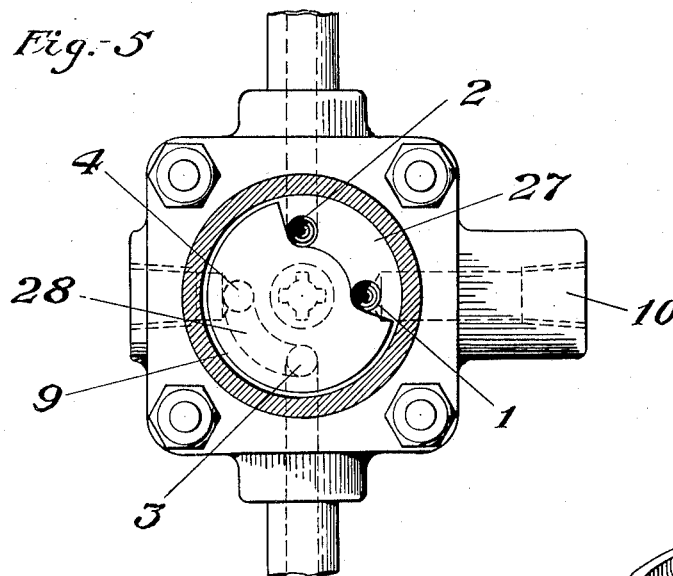
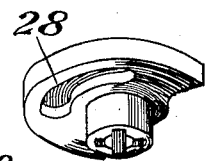
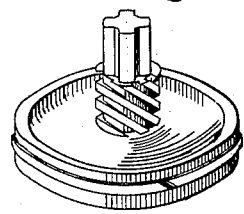
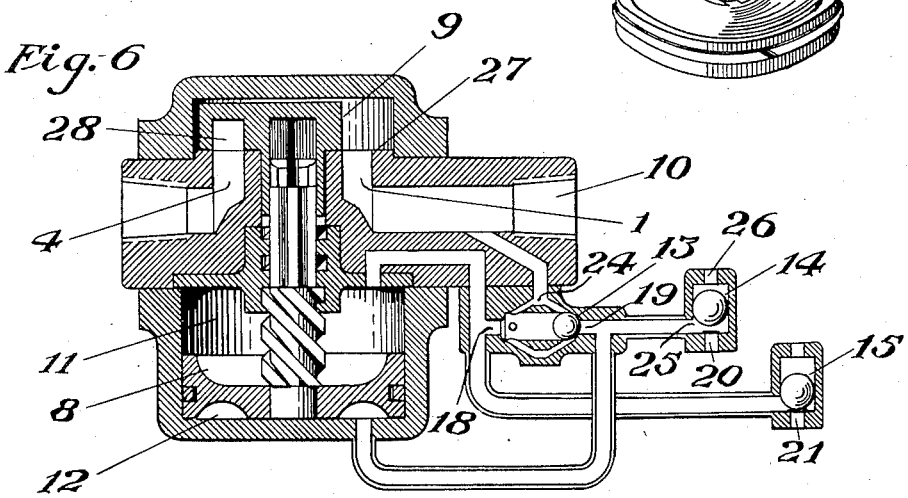

UNITED STATES PATENT OFFICE.

EMORY LEE RATHBURN, OF CHICAGO, ILLINOIS.

FLUID-PRESSURE-CONTROL SYSTEM.

1,374,323.  Specification of Letters Patent.  Patented Apr. 12, 1921.

Application filed March 18, 1920. Serial No. 367,010.

*To all whom it may concern:*

Be it known that I, EMORY LEE RATHBURN, a citizen of the United States, residing at Chicago, in the county of Cook and State of Illinois, have invented certain new and useful Improvements in Fluid-Pressure-Control Systems, of which the following is a specification.

My invention relates generally to an improved valve system for controlling the flow of elastic fluid in the operation of devices such as doors, dampers, switches and signals, which derive their motive power from the pressure of air or similar elastic fluid, and relates particularly to an improved system of valves, for distributing the fluid to such devices, in which the main flow controlling valve unit includes and derives its motive power from an auxiliary fluid pressure motor, which motor is actuated by a small part of the main air supply, and in response to an easily operated remotely located master control valve.

Among the objects of my invention is to provide a system of remote control in which the air in the main power producing device is directly controlled by an automotive main valve unit, which is governed by an easily operated controlling device, located at a suitably remote point in a controlling pipe line, which facilitates the rapid communication of pressure variations by its small capacity, a passage of as little as 1% of the air displacement of the main motor, per operation being ample. Choking and freezing, due to accumulations of oil and water in the small controlling pipe line being eliminated by a supplemental venting of its pressure, in each operation, at or near the main valve unit by means of an automatic bleeder valve. The advantage of a system in which a small fractional part of the air is used by the auxiliary motor, and which only a small fractional part of such air has to pass through the pipe line to the remote controlling valve, is readily apparent.

My invention will be more clearly understood when described with reference to the accompanying drawings, which will serve to illustrate one embodiment. In the Figures 1, 2, 3, 4, 5, 6, 7 and 8 the parts and mechanisms are shown quite diagrammatically to more plainly illustrate their arrangement and coöperation, it being of course understood that in actual practice the parts will be constructed and arranged to obtain the greatest compactness and efficiency. I shall first describe the various mechanisms and then their coöperation.

Figure 1:
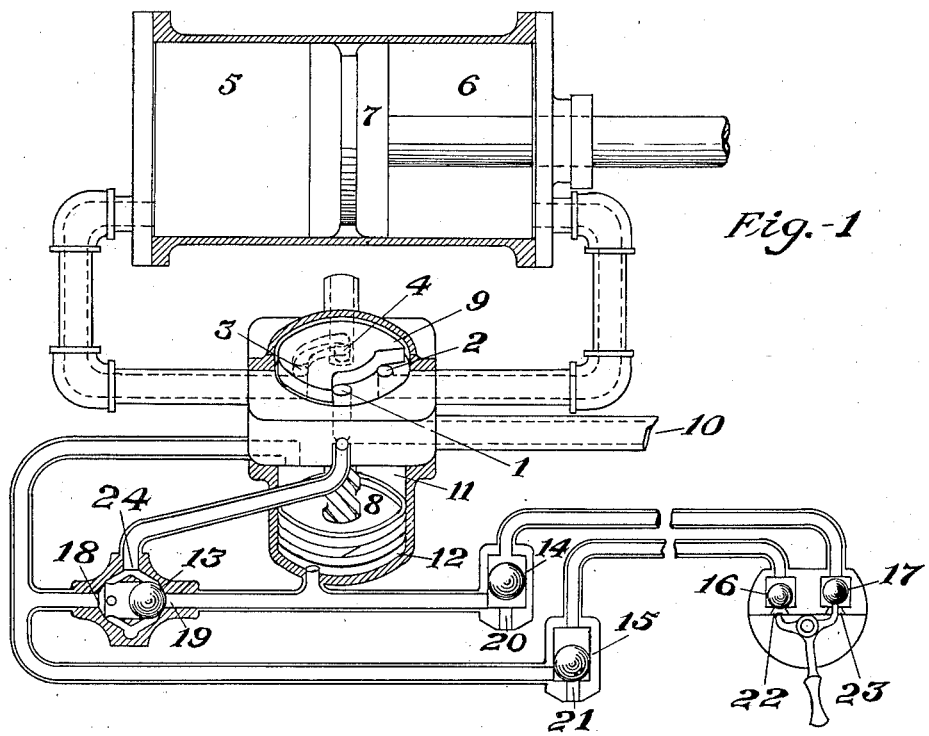
Figure 2:
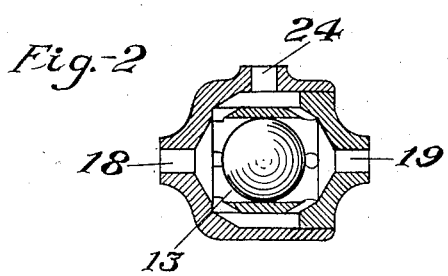
Figure 3:
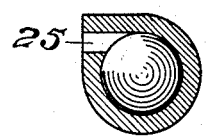
Figure 4:
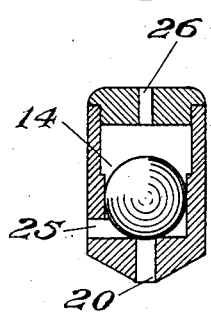

Fig. 1 is a more or less diagrammatic layout of the various parts and improved mechanisms comprising my system, and will best serve to illustrate its operation. I have shown here a main power-producing motor of the double acting reciprocating type. Fig. 2 is a detail drawing of the directing check valve, shown in a central sectional view. Figs. 3 and 4 are sectional views of one of the automatic bleeder valves. Fig. 5 is a top plan view of the main valve unit, with a part of the upper casing cut away, showing the arrangement of its ports. Fig. 6 is a vertical central sectional view of the main valve unit, showing the assembly of the rotary valve, the auxiliary fluid pressure motor and mechanisms employed to convert the reciprocating to a rotary movement. Also the air connections between the main valve unit, the directing check valve and the bleeder valves are shown. Fig. 7 is a lower perspective view of the rotary part of the main valve, showing its protected exhaust passage and hollow splined extension centrally alined with the axis of the valve, the motive power being supplied through this extension. Fig. 8 is an upper perspective view of the auxiliary motor piston, showing its spiral stem, splined at the upper to provide a positive drive sliding connection.

Similar characters refer to similar parts of the invention throughout the several views.

The self-acting main valve unit, shown herein, includes a four-way rotary valve, consisting of a stationary plane circular valve seat, 27 (in Figs. 5 and 6) having four perpendicular openings or ports, ninety degrees apart, and designated by 1, 2, 3 and 4. The ports 2 and 3 are connected closely to the expanding chambers 6 and 5 (Fig. 1) of the main device, to conserve air displacement and effect a quickly responsive operation of the device. The fluid pressure from a suitable source, such as an air storage tank and compressor, is permanently supplied through the main pipe 10, and connected by the port 1, to the upper main valve chamber, a full working pressure being maintained at all times therein. The exhaust port 4 leads out to atmosphere and is not at any time exposed to the supply pressure of the valve chamber. The movable part, a rotary valve gate 9, is shown as a short cylinder having a segment cut away, and a circular exhaust passage 28, formed in the lower seating surface; the centrally alined extension, of smaller diameter, which projects down through the stationary seat, is closely fitted therein, and serves as a pilot as well as a sliding drive power connection. 9 is adapted to a rotary movement of ninety degrees. The lower part of the main valve unit is constructed as the double acting auxiliary fluid pressure motor, which consists of the reciprocating piston 8, located between the expanding chambers 11 and 12, in a closely fitting bore of a cylinder; 8 is free to rotate with its centrally alined spiral stem, which moves in a mated stationary nut, the upper end of the stem being splined and adapted to slide within the lower extension of 9, thereby effecting a positive rotary drive. The expanding chambers 11 and 12 are shown connected respectively to the orifices 18 and 19 of the directing check valve, at which orifices the ball 13, alternately seats; 13 is contained in the closely fitting cylindrical bore with which 18 and 19 are centrally alined. The directing check valve is permanently supplied with air pressure through the orifice 24 and its branches, by means of a suitable connection to the main supply in 10. The two bleeder valves, which are similarly constructed, are shown in Fig. 6, as closely connected to the orifices 18 and 19 respectively, and also directly communicating with the expanding chambers 11 and 12. The automatic bleeder valve, illustrated in Figs. 3 and 4, consists essentially of the ball 14, contained and free to move in the closely fitting bore of a cylindrical incasement with centrally alined reduced openings 20 and 26 at the ends of the bore, 20 leads out to atmosphere, and is adapted to seat 14 at the upper end; 26 connects with the controlling pipe line. The supply orifice 25 is on a line nearly tangent to the cylindrical bore as pointed out in Fig. 3. Fig. 1 shows the controlling pipe lines extending to a master controller in the form of a double venting device in which the balls 16 and 17 seat at and close the orifices 22 and 23.

In operation a small part of the main air supply, in 10, is conducted through 24 into the directing check valve and with the ball 13 unseated the compressed air is free to flow through 18 and 19, equally charging the expanding chambers 11 and 12, their respective bleeder valves and ultimately the controlling pipe line, by leakage post 14 and 15.

By forcibly unseating 17, by means of a suitable mechanical movement, venting the one side of the pipe line and upper chamber of the connected bleeder valve, 14 is unseated by the remaining greater pressure of the lower chamber, which pressure is in turn released through 20. With the resulting reduction of pressure in 12 and its connections, the ball 13 is seated at 19, by a pronounced flow in that direction, diverting the supply of pressure through 18 to 11. The piston 8 is forced downward and with its spiral stem rotates in a counter-clockwise direction; the connected valve gate 9 rotates similarly, exposing the port 2 and connecting 3 and 4 by the cavity 28. The full working pressure is supplied to the expanding chamber 6 of the main power producing device, forcing the piston 7 into the exhausted chamber 5. As 23 is again closed 14 reseats at 20, and this side of the system is slowly recharged by leakage past 8. Venting at 22 with sequent actions of 15 and 13 results in a ninety degree clock-wise movement of 9, exposing the port 3 and connecting 2 and 4. As 5 is supplied with pressure and 6 is exhausted, 7 exerts its power in the reverse direction. The relatively small total of air displacement of the auxiliary motor and its connections, and of the controlling pipe line, makes possible a reliable system of remote control with a maximum of efficiency.

Now that I have described my invention, what I claim is:

1. In a fluid pressure actuated device; a system of remote control comprising an automatic main valve unit, suitably located controller valves and a line of hollow conductors connecting the automatic main unit to said remote controllers; such connecting conduit being required to transmit less than 10% of the total fluid supplied to the main unit, through which main unit the fractional supply is derived entirely.

2. In remotely controlled fluid pressure actuated devices; a system of valves for effecting such control; the flow of fluid in the main device being directly controlled by a fluid pressure actuated main valve unit to which the permanent supply of fluid pressure is connected; a small fractional part of such supply serving to actuate the motor of the main valve and charge a relatively small connected conduit which extends to one or more suitably located controller valves; the actions of the main valve and the subsequent performance of the main power producing device being governed by pronounced changes of pressure within the small connecting conduit, such changes being caused by operations of the remotely located controller valves to which said conduit extends.

3. In combination with a double acting power producing device deriving its motive power from the pressure of an elastic fluid, a closely connected main valve unit which is permanently supplied with the fluid pressure and which derives its motive power from a part of such fluid by means of an auxiliary fluid pressure motor controlled by one or more remotely located easily operated controller valves, which valves are connected with a double controlling pipe line of restricted capacity extending from and supplied with fluid respectively by the chambers of said auxiliary motor, operation of which motor is effected by exhaustion of pressure in one of its chambers through the connected controlling pipe, the fluid supply to such exhausted chamber being automatically checked.

4. In combination with a fluid pressure actuated motor having a sliding abutment exposed to an expanding chamber or chambers, a system of remote control consisting of a main valve for controlling the flow of fluid to this motor, a double acting fluid pressure motor for operating this valve and having a sliding abutment and two expanding chambers, a means located at a suitable distance for reducing the pressure in the respective expanding chambers of the auxiliary motor through a connecting double pipe line and a directing check valve for controlling the supply of fluid to these chambers which automatically diverts such supply from the chambers being exhausted.

5. A remote control system of the class described having an automatic main valve unit permanently supplied with the fluid pressure and actuated with a small part of such fluid by means of an included auxiliary motor having a sliding abutment and two expanding chambers, which chambers are connected through automatic bleeder valves to tubular conductors extending to suitably located pressure regulator valves. The inert main valve unit, its motor chambers and a connecting tubular control line being equally supplied with pressure and caused to operate by reduction of pressure in either motor chamber through its connected tubular conductor, such reduction being amplified by a coöperative opening of the bleeder valve and by the automatic temporary checking of its fluid supply.

6. In combination with a fluid pressure actuated device of the class described, a system of remote control comprising a directly connected automatic main flow controller valve unit having one or more master controller valve units remotely connected through a double conduit of small transient capacity with automatic auxiliary controller valves respectively interposed at or near the main valve unit, the main valve motor chambers and their respective connections are supplied with a part of the fluid pressure through an automatic directing check valve; the main flow of fluid in the device is directly controlled by action of the main valve unit, which action being supplied by a relative difference of pressure in the motor chambers, due to primary venting at a master controller valve, supplementary co-incident venting at the automatic auxiliary valve and a temporary checking of the supply to the chamber being exhausted.

EMORY LEE RATHBURN